Inventor,
Edgar A. Koenig.
Mason + Hatfield
By     attys.

April 3, 1956 — E. A. KOENIG — 2,740,606
PIPE STOPPER
Filed Oct. 29, 1951 — 2 Sheets-Sheet 2
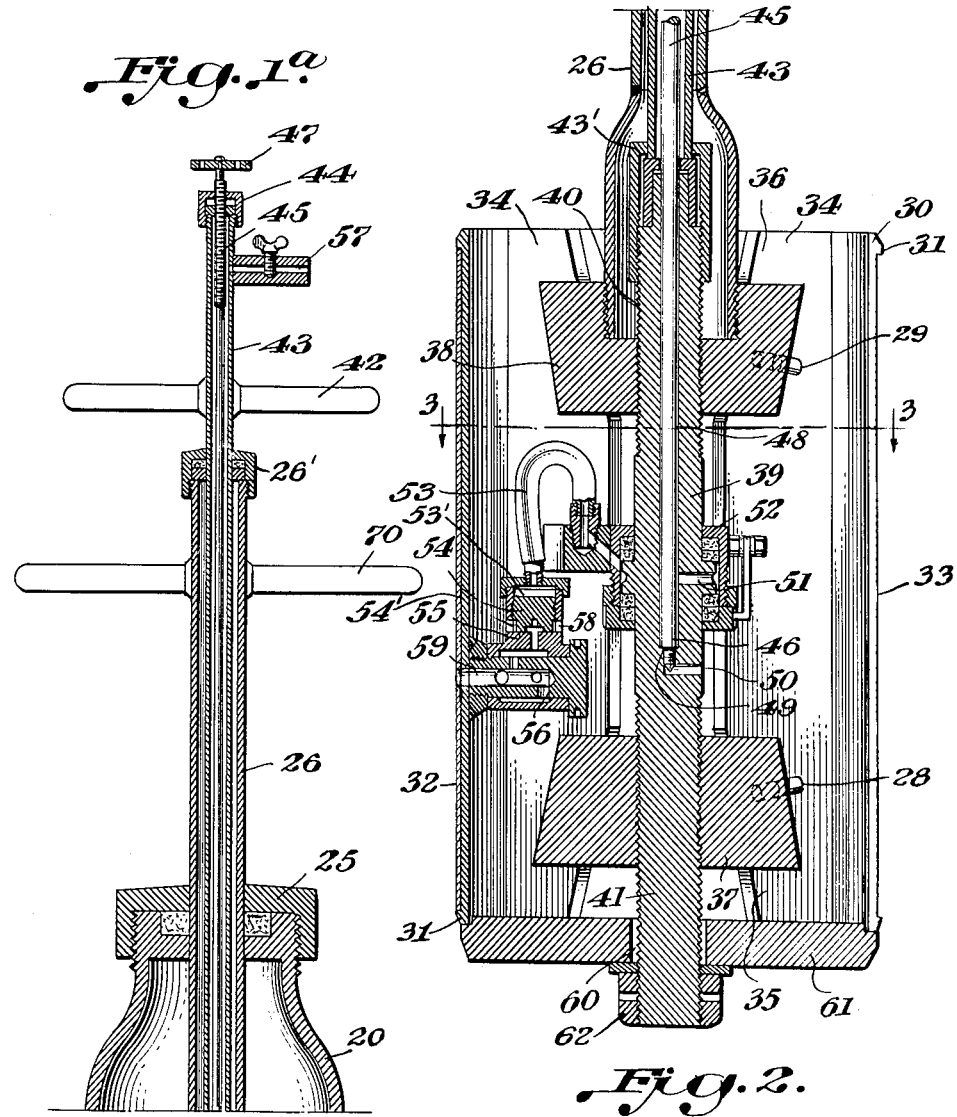
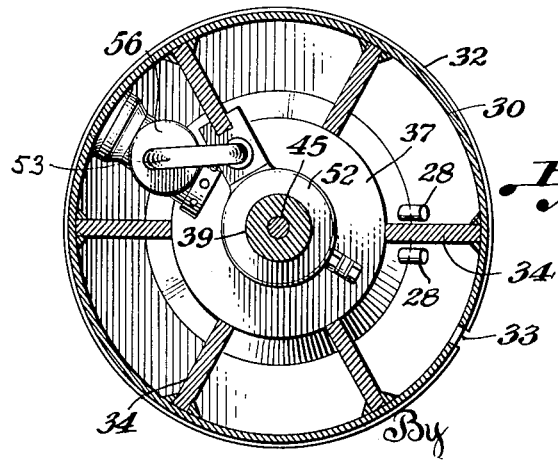
Inventor;
Edgar A. Koenig.
By Mason + Hatfield attys.

United States Patent Office 2,740,606
Patented Apr. 3, 1956

2,740,606

PIPE STOPPER

Edgar A. Koenig, Shreveport, La.

Continuation of application Serial No. 638,865, January 3, 1946. This application October 29, 1951, Serial No. 253,643

26 Claims. (Cl. 251—175)

The present invention relates to a pipe stopper of the expanding plug type which is adapted to be inserted into a transverse circular cut-out portion of a pipe to be shut off and expanded into pipe stopping or shut-off relation with the edges of the cut-out portion of the pipe. This application is a continuation of the copending application of Edgar A. Koenig, Serial No. 638,865, filed January 3, 1946, now abandoned.

It is a principal object of my invention to provide a pipe stopper or plugging device of the type under consideration that, upon expansion, will completely shut off the flow of high pressure fluids of the order of 300 to 1000 p. s. i. as well as lower pressures.

It is also an important object of my invention to provide a pipe stopper of the expansible plug type which may be readily inserted into a transverse cut-out portion of a pipe to be shut off and expanded to effectively shut off the flow of high pressure fluids and which may be easily contracted and removed at any desired time without damage or distortion to the plug so that it may be used again without repair or replacement of parts such as is required of the previously known pipe stoppers when used to shut off very high pressure fluids.

Pipe stoppers of the expansible plug type are usually inserted through a transverse opening or cut-out portion of the pipe to be shut off. This opening may be made by welding a pressure fitting to the pipe and bolting a gate valve to the pressure fitting. A drilling tool or fitting may then be attached to the gate valve and the drill inserted through the open valve to drill the opening or cut through the pipe. Thereafter the drill is removed and the gate valve is closed to prevent the escape of fluid from the cut or drilled pipe. A plug bell containing a stopper plug may then be attached to the gate valve and the plug inserted through the previously opened gate valve into the drilled out portion of the pipe. When the plug is expanded, the fluid pressure in the pipe will be shut off at the downstream side of the plug. When drilling the pipe, there is an unavoidable tendency for the drill to wobble slightly and this tends to cause the opening to be slightly larger on one side of the pipe than on the other. Hence, if an expansible plug is used to shut off high pressures, some provision should be made in the plug expanding means to assure that one end of the plug will be expanded slightly more than the other end in order to effectively seal against the edges of the cut-out portion of the pipe.

It is therefore an important object of my invention to provide a cylindrical expansible plug type of pipe stopper with an expanding means which automatically adjusts itself to permit slightly more expansion at one end of the plug in order to assure a complete shut off of high pressure fluids in a pipe even though the transverse opening or cut-out portion through the pipe may be slightly larger at one side of the pipe than at the other.

It is also an object of my invention to provide an expansible pipe stopper particularly designed to shut off very high fluid pressures within a pipe and so constructed that the fluid pressure within the pipe may be used to facilitate the expansion of the plug when shut off is desired and further constructed with a controllable fluid pressure by-pass valve within the plug body to permit equalization of the fluid pressure, within the pipe and plug, on both sides of the plug when it is desired to contract the plug and remove it from the pipe.

It is another object of my invention to provide a pipe stopper of the expansible plug type that will expand substantially uniformly about the entire circumference thereof for a more effective sealing engagement with the edges of a transverse opening in a pipe line.

Further objects and advantages of my invention will be apparent by reference to the following specification and drawings, in which:

Figure 1a is a sectional view constituting a continuation of Figure 1 and showing the upper portion of the plug bell together with the plug operating controls.

Figure 2 is an enlarged longitudinal sectional view of the expansible plug body shown in Figure 1 and illustrating the details of the by-pass valve.

Figure 3 is a cross-sectional view taken on line 3—3 of Figure 2.

Figure 1:
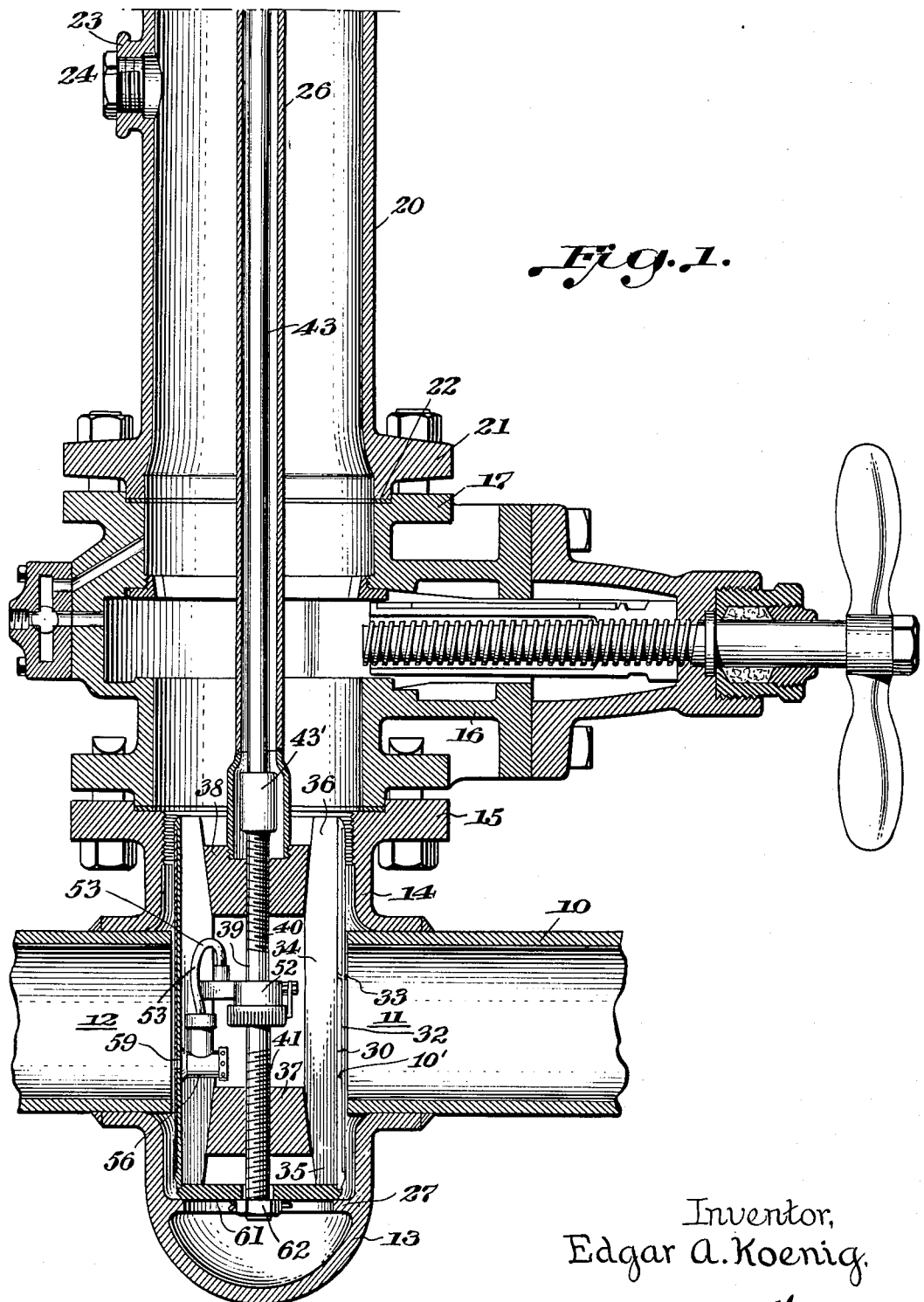
Figure 1 is a longitudinal cross-sectional view of a plugging device embodying my invention and shown inserted in a transverse opening through a pipe line and also showing in cross section the necessary pipe fittings, gate valve, and a portion of the plug bell.

Referring to Figure 1 of the drawings a pipe line 10 containing fluid under pressure is shown with the pipe stopper of my invention inserted into a transverse cylindrical cut-out portion 10′ of the line in position to be expanded to shut off the fluid pressure from pipe section 11 to pipe section 12. A pipe fitting, such as a well known pressure control fitting and comprised of the bottom section 13 and top section 14, is welded to the pipe 10, as shown, and the sides of the two sections are welded together. The top section 14 is provided with a flange 15 to which a conventional gate valve, generally shown at 16, is bolted. The gate valve 16 is shown in the open position and, since it forms no part of my invention and its operation is obvious, will not be further referred to in detail. To the upper flange 17 of the gate valve 16 may be bolted a conventional drilling fitting or tool (not shown) and the drill may be passed through the open gate valve to drill or cut the cylindrical opening 10′ through the pipe 10. The diameter of the transverse opening 10′, for obvious reasons, is at least as large as the inner diameter of the pipe line 10. The drill may then be withdrawn and the gate valve 16 closed to prevent escape of fluid pressure from the drilled pipe. After the drill fitting is removed from the flange 17, the pipe stopper or plug of my invention may be attached to the gate valve flange 17 and the plug inserted into the drilled opening 10′ of the pipe line.

A plug bell 20, having a flanged open end 21, is bolted to the flange 17 of the gate valve and sealed thereto by a sealing ring 22. A threaded opening 23 in the side wall of the bell 20 is normally closed by a threaded plug 24 and its function will be referred to hereinafter. At the closed upper end of the plug bell 20 is a stuffing box 25 (Figure 1a) through which is slidably journalled the tubular operating stem 26 of the pipe stopper or plug. Thus the plug may be retracted into a position within the plug bell 20 until the plug bell is bolted and sealed to the gate valve 16, after which the gate valve may be opened and the plug body lowered through the valve into the opening 10′ in the pipe line 10. A shoulder 27 within the bottom section 13 of the pressure fitting is adapted to provide a seat for the bottom or base plate 61 of the plug when it is lowered into the pipe opening 10′, in order to properly position the plug axially therein.

With reference to Figures 1, 2, and 3, it will be seen that the pipe stopper or plug device of my invention is provided with a cylindrical sleeve 30 of relatively thin wall thickness and normally of slightly less diameter than the hole or cut-out portion 10′ drilled through the pipe line 10. The plug sleeve 30 is preferably formed of a resilient or springy material, such as certain types of good steel or the like, and is machined to provide a cylindrical exterior having circumferential end flanges 31 for retention of a sleeve covering or sheath 32 of suitable gasket material. When the plug is to be used to shut off very high fluid pressures, the covering 32 preferably is of a laminated rubber and fabric construction. Extending the entire length of the plug sleeve 30 and covering 32 is a narrow longitudinal slot 33 (see Figure 3). It is intended that the plug be inserted in the opening 10′ of the pipe line 10 with the slot 33 facing the upstream side of the line, as shown in Figure 1, so that line pressure may enter into the plug sleeve 30 and into the bell 20. Hence, when the by-pass valve, to be later described, is closed, line pressure facilitates expansion of the plug into shut-off relation. The slot 33 also functions to permit expansion and contraction of the resilient plug sleeve 30, as will be readily understood.

In order to obtain uniform expansion of the plug sleeve 30, which may also be called the body of the plug, the sleeve should be provided on its interior with a plurality of circumferentially-narrow, radially inwardly-facing wedging surfaces spaced substantially uniformly about the entire circumference of the sleeve. These surfaces may be provided by a number of inwardly-directed, longitudinally-extending, radial vanes 34 welded or otherwise suitably secured to the interior of the sleeve, as shown. The vanes are spaced substantially uniformly about the entire inner circumference of the sleeve 30 and disposed symmetrically on opposite sides of the slot 33. For practical purposes, about four such vanes is the minimum number. In actual practice four such vanes have been found to be satisfactory for 4 to 6 inch stoppers with an approximately corresponding increase in number for larger size stoppers. Thus, a 10 inch stopper requires about 6 vanes, and a 20 inch stopper about 10 vanes. It will be noted that the symmetrical disposition of the vanes 34, with respect to the slot 33, locates two vanes closely adjacent the opposite sides of the slot. These two vanes effect the major portion of the expansion of the sleeve, as later described. The vanes 34 have oppositely tapered end portions 35 and 36 which form wedging surfaces that cooperate with appropriate expanding means, here shown as oppositely tapered frusto-conical wedging members 37 and 38, respectively. The expanding members 37 and 38 are threadedly mounted upon a jackscrew 39 having two sets of threads 40 and 41 of opposite pitch, so that when the jackscrew is turned the members 37 and 38 are moved either toward or away from each other to expand or contract the plug, depending upon the direction in which the jackscrew is turned.

The expanding members 37 and 38 are held against rotation, upon rotation of the jackscrew 39, by the tubular stem 26 that is belled outwardly at its lower end and threadedly engaged in a recess in the outer end of the upper member 38. Two pairs of pins 28 and 29 project outwardly from each of the members 37 and 38, respectively, and straddle one of the vanes 34, as best shown in Figures 2 and 3, in order to connect the member 37 to the member 38 for rotation therewith, or to be held against rotation thereby. It will also be seen that the pins 28 and 29 connect the sleeve 30 to the stem 26 for rotation thereby. Preferably, the stem 26 is provided with a handle 70 for facilitating its movement.

Rotation of the jackscrew 39 is accomplished by a hollow shaft 43 that has a socketed lower end operatively receiving the reduced upper end of the jackscrew and secured to the latter by a coupling ring 43′. The shaft 43 passes through a stuffing box 26′ at the upper end of the stem 26 and its projecting portion is provided with a handle 42 and a petcock 57. The function of the petcock will be described hereinafter.

The upper end of the shaft 43 also is provided with a stuffing box 44 through which is threaded the shaft 45 of a needle valve 46. An operating handle 47 is provided for the needle valve shaft 45, which extends down through the hollow shaft 43 and into an opening or axial bore 48 that is drilled in the jackscrew and communicates, at its lower end, with a drilled lateral port 50. Somewhat above its lower end, the bore 48 is provided with a seat 49 for the needle valve 46 and above the seat is another lateral port 51. The port 51 provides communication between the bore 48 and the interior of a stuffing box 52 that is rotatably mounted on an intermediate section of the jackscrew 39 and has a flexible connection 53 communicating with the interior thereof. The connection 53 communicates with the pressure chamber 53′ of a differential piston by-pass valve 56 having a cylinder that houses a differential piston 54, which cooperates with a valve seat 55. A circumferential groove 54′ in the piston 54, adjacent the sealing surface thereof, provides a reduced differential pressure area exposed, via ports 58 in the cylinder, to the pressure within the sleeve 30. The valve 56 controls communication between the interior of the sleeve 30 and a port 59 therein opposite the slot 33.

The port 50 permits upstream line pressure to reach the needle valve seat 49, via the slot 33 and interior of the sleeve 30. Hence, when the needle valve 46 is opened, fluid pressure may pass into the drilled opening 48 around the needle valve shaft 45, and out through the port 51, through the interior of stuffing box 52 and the flexible connection 53 to the pressure chamber 53′. The fluid pressure in the chamber 53′ functions to seat the valve piston 54 against the valve seat 55 of the by-pass valve 56, thus closing the by-pass valve when the needle valve 46 is open. When the needle valve is closed, the fluid pressure within chamber 53′, connection 53, port 51, drilled opening 48, and hollow shaft 43 may be drained off by opening the petcock 57. Thereupon, fluid pressure within the sleeve 30 and pipe line section 11 acts against the reduced pressure area provided by the groove 54′ and forces the piston 54 off of the valve seat 55, thus opening the bypass valve 56 and permitting upstream line pressure to pass through the port 59 to equalize the fluid pressure in the pipe sections 11 and 12 and in the sleeve 30. With the pressure thus equalized, the sleeve 30, because of its inherent resiliency, will readily contract for removal from the pipe line upon separating movement of the wedging members 37 and 38. Because of such automatic contraction, the rubber sheath 32 is not apt to be damaged during removal of the stopper from the opening in the line.

It should be noted that the jackscrew 39 passes through an unthreaded opening 60 in the base plate 61 of the plug and has a plate-retaining nut 62 thereon. Thus, when the handle 42 is turned to move the expanding cones 37 and 38 toward each other to expand the sleeve 30, an axial floating movement of the expanding cones and jackscrew assembly toward the base plate 61 is permitted to automatically compensate for a larger diameter at the top of the opening 10′ through the pipe line 10 than at the bottom thereof, and thus permit a larger amount of expansion at the upper portion of the sleeve 30. This is an important feature of my invention, since it assures a complete sealing off or shut off of the high pressure fluid in the pipe line, thus making the pipe stopper of my invention suitable for use in oil fields or the like where high fluid pressure of inflammable mixtures are encountered.

To summarize the operation of the plugging device of my invention, the petcock 57 is closed and the plug is pushed down out of the bell 20 and inserted within the drilled-out portion 10' of the pipe line to be shut off, whereupon the handle 70 is turned to turn the sleeve 30 until the slot 33 is facing the flow of fluid pressure, i. e., the upstream side of the line. The handle 47 is then turned to open the needle valve 46 so that line pressure is applied to the valve piston 54 to close the by-pass valve 56. Line pressure then tends to expand the sleeve and by turning the handle 42 in the proper direction, while holding the handle 70 against rotation, the expansion cones 37 and 38 may be easily moved toward each other to expand the sleeve into shut-off relation with the edges of the opening 10' through the pipe line. By using the fluid pressure in the pipe line to assist in expanding the plug, I am enabled to completely stop the flow of very high fluid pressures in the order of 300–1000 p. s. i.

It is an advantageous feature of my invention that when it is desired to gain access to and use the fluid pressure within pipe section 11 while pipe section 12 is shut off by the plug valve, the plug 24 may be removed from the opening 23 in the bell and a suitable pipe fitting and valve (not shown) may be attached. When it is desired to remove the pipe stopper or plug, the needle valve 46 is closed and the petcock 57 opened to relieve the pressure in the pressure chamber 54'. Thereupon, the fluid pressure within the sleeve 30 acts to unseat the valve piston 54 and open the by-pass valve 56 to permit the pressure within the sleeve 30 and pipe line sections 11 and 12 to be equalized. With the pressure equalized, the handle 42 may be turned to separate the expansion cones 37 and 38 and thus permit the resilient sleeve 30 to spring back to its normal diameter, whereupon it may be easily removed without distortion or breakage of parts.

It will also be seen that the outer edges of the circumferential sleeve flanges 31, and also the base plate 61, are chamfered to facilitate insertion of the stopper into the transverse opening 10' in the pipe line. Additionally, the flanges 31 serve to protect the gasket material covering 32, during insertion and removal of the stopper, from the burrs on the edges of the opening 10' that are usually formed in the drilling operation.

Another and important feature of the invention resides in the fact that the sleeve expanding means, i. e., the frusto-conical wedging members 37 and 38, are confined within the peripheral outline of the sleeve. Hence, the expanding wedge means cannot contact the edges of the opening 10' during the expanding operation, and, therefore, are constantly effective to exert expanding forces on the sleeve 30 to the full extent of expansion of the latter, i. e., the wedge means cannot bind against the edges of the opening 10' before the sleeve is fully expanded. Still another important feature resides in the use of the longitudinal vanes or ribs 34 extending the entire length of the sleeve 30 to provide wedging surfaces on the interior thereof. The uniform spacing of these vanes about the entire circumference of the sleeve and their symmetrical disposition with respect to the sleeve slot 33 results in a uniform expansion of the sleeve that achieves a more effective sealing engagement between the exterior of the sleeve and the edges of the cut-out portion 10' of the pipe line. In this respect it is to be noted that the two vanes closely adjacent opposite sides of the slot probably effect the major portion of the expansion of the sleeve.

It will thus be seen that the objects of this invention have been fully and effectively accomplished by simple apparatus. It will be realized, however, that various changes may be made in the specific embodiment used to illustrate the invention without departing from the principles thereof. Therefore, this invention includes all modifications encompassed by the spirit and scope of the following claims.

I claim:

1. A pipe stopper comprising a cylindrical sleeve adapted to be inserted transversely through a cut-out portion of a pipe line, said sleeve having a slot extending its entire length, a plurality of radially extending inward vanes secured to the interior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

2. A pipe stopper comprising a cylindrical sleeve adapted to be inserted transversely through a cut-out portion of a pipe line, a gasket material secured to the exterior of said sleeve, said sleeve having a slot extending its entire length, a plurality of radially extending inward vanes secured to the interior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

3. A pipe stopper comprising a resilient cylindrical sleeve adapted to be inserted transversely through a cut-out portion of a pipe line, said sleeve having a slot extending its entire length, a plurality of radially extending inward vanes secured to the interior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

4. A pipe stopper comprising a resilient cylindrical sleeve adapted to be inserted transversely through a cut-out portion of a pipe line, a gasket material secured to the exterior of said sleeve, said sleeve having a slot extending its entire length, a plurality of radially extending inward vanes secured to the interior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

5. A pipe stopper comprising a cylindrical sleeve adapted to be inserted transversely through a cut-out portion of a pipe line, said sleeve normally being of slightly less diameter than said cut-out portion but of slightly greater diameter than said pipe line and having a slot extending its entire length, a plurality of radially extending inward vanes secured to the interior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

6. A pipe stopper comprising a cylindrical sleeve adapted to be inserted transversely through a cut-out portion of a pipe line, a gasket material secured to the exterior of said sleeve, said sleeve normally being of slightly less diameter than said cut-out portion but of slightly greater diameter than said pipe line and having a slot extending its entire length, a plurality of radially extending inward vanes secured to the exterior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

7. A pipe stopper comprising a resilient cylindrical sleeve adapted to be inserted transversely through a cut-out portion of a pipe line, said sleeve having a slot extending its entire length, means to rotate said sleeve and position said slot in a direction facing the flow of fluid pressure in the pipe line, a by-pass opening in the wall of said sleeve, a valve operative to control the passage of fluid pressure through said by-pass, remote control means to operate said valve, and means to expand said sleeve into pipe stopping relation with the pipe line.

8. A pipe stopper comprising a resilient cylindrical sleeve adapted to be inserted transversely through a cut-out portion of a pipe line, a gasket material secured to the exterior of said sleeve, said sleeve having a slot extending its entire length, means to rotate said sleeve and position said slot in a direction facing the flow of fluid pressure in the pipe line, a by-pass opening in the wall of said sleeve, a valve operative to control the passage of fluid pressure through said by-pass, remote control means to operate said valve, and means to expand said sleeve into pipe stopping relation with the pipe.

9. A pipe stopper comprising a cylindrical sleeve adapted to be inserted transversely through a cut-out portion of a pipe line, said sleeve normally being of slightly less diameter than said cut-out portion but of slightly greater diameter than said pipe line and having a slot extending its entire length, means to rotate said sleeve and position said slot in a direction facing the flow of fluid pressure in the pipe line, a by-pass opening in the wall of said sleeve, a valve operative to control the passage of fluid pressure through said by-pass, remote control means to operate said valve, and means to expand said sleeve into pipe stopping relation with the pipe line.

10. A pipe stopper comprising a resilient cylindrical sleeve adapted to be inserted transversely through a cut-out portion of a pipe line, a gasket material secured to the exterior of said sleeve, said sleeve normally being of slightly less diameter than said cut-out portion but of slightly greater diameter than said pipe line and having a slot extending its entire length, means to rotate said sleeve and position said slot in a direction facing the flow of fluid pressure in the pipe line, a by-pass opening in the wall of said sleeve, a valve operative to control the passage of fluid pressure through said by-pass, remote control means to operate said valve, and means to expand said sleeve into pipe stopping relation with the pipe line.

11. A pipe stopper comprising a cylindrical sleeve adapted to be inserted transversely through a cut-out portion of a pipe line, said sleeve having a slot extending its entire length, means to rotate said sleeve and position said slot in a direction facing the flow of fluid pressure in the pipe line, a by-pass opening in the wall of said sleeve, a valve operative to control the passage of fluid pressure through said by-pass, remote control means to operate said valve, a plurality of radially extending inward vanes secured to the exterior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

12. A pipe stopper comprising a cylindrical sleeve adapted to be inserted transversely through a cut-out portion of a pipe line, a gasket material secured to the exterior of said sleeve, said sleeve having a slot extending its entire length, means to rotate said sleeve and position said slot in a direction facing the flow of fluid pressure in the pipe line, a by-pass opening in the wall of said sleeve, a valve operative to control the passage of fluid pressure through said by-pass, remote control means to operate said valve, a plurality of radially extending inward vanes secured to the interior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

13. A pipe stopper comprising a cylindrical sleeve adapted to be inserted transversely through a cut-out portion of a pipe line, said sleeve normally being of slightly less diameter than said cut-out portion but of slightly greater diameter than said pipe line and having a slot extending its entire length, means to rotate said sleeve and position said slot in a direction facing the flow of fluid pressure in the pipe line, a by-pass opening in the wall of said sleeve, a valve operative to control the passage of fluid pressure through said by-pass, remote control means to operate said valve, a plurality of radially extending inward vanes secured to the interior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

14. A pipe stopper comprising a cylindrical sleeve adapted to be inserted transversely through a cut-out portion of a pipe line, a gasket material secured to the exterior of said sleeve, said sleeve normally being of slightly less diameter than said cut-out portion but of slightly greater diameter than said pipe line and having a slot extending its entire length, means to rotate said sleeve and position said slot in a direction facing the flow of fluid pressure in the pipe line, a by-pass opening in the wall of said sleeve, a valve operative to control the passage of fluid pressure through said by-pass, remote control means to operate said valve, a plurality of radially extending inward vanes secured to the interior of said sleeve, said vanes having oppositely tapered end portions, a jackscrew, a pair of oppositely tapered cones cooperating with said tapered end portions and threaded on oppositely threaded ends of said jackscrew, means to rotate said jackscrew and move said cones to expand said sleeve, said jackscrew being capable of limited axial movement relative to said sleeve, and means to prevent rotation of said cones with respect to said sleeve and said sleeve with respect to the pipe line upon rotation of said jackscrew.

15. A pipe stopper comprising: a longitudinally-split flexible cylindrical sleeve adapted to be inserted into, and having a normal outer diameter less than, a transverse circular opening through a pipe line, the diameter of the opening being at least as large as the inner diameter of the pipe line; means defining a plurality of radially-disposed circumferentially-narrow wedging surfaces on the interior of said sleeve and spaced substantially uniformly about the entire circumference thereof; and wedge means confined within the peripheral outline of said sleeve and mounted for movement into wedging engagement with said wedging surfaces to produce a plurality of radially outwardly directed expansive forces on said sleeve spaced substantially uniformly about the entire circumference thereof for expanding said sleeve into flow-stopping sealing engagement with the edges of the opening through the pipe line.

16. The structure defined in claim 15 in which the wedging surfaces comprise the inner edges of a plurality of longitudinal vanes secured to the inner side of the sleeve.

17. A pipe stopper comprising: a longitudinally-split flexible cylindrical sleeve adapted to be inserted into, and having a normal outer diameter less than, a transverse circular opening through a pipe line, the diameter of the opening being at least as large as the inner diameter of the pipe line; means defining a plurality of radially-disposed circumferentially-narrow wedging surfaces on the interior of said sleeve, spaced substantially uniformly about the circumference thereof, and disposed symmetrically about the split therein; and wedge means confined within the peripheral outline of said sleeve and mounted for movement into wedging engagement with said wedging surfaces to produce a plurality of radially outwardly directed expansive forces on said sleeve spaced substantially uniformly about the entire circumference thereof for expanding said sleeve into flow-stopping sealing engagement with the edges of the opening through the pipe line.

18. A pipe stopper comprising: a longitudinally-split flexible cylindrical sleeve adapted to be inserted into, and having a normal outer diameter less than, a transverse circular opening through a pipe line, the diameter of the opening being at least as large as the inner diameter of the pipe line; means defining a plurality of radially-disposed circumferentially-narrow wedging surfaces on the interior of said sleeve and spaced substantially uniformly about the entire circumference thereof; and frusto-conical wedge means confined within the peripheral outline of said sleeve and mounted for axial movement into wedging engagement with said wedging surfaces to produce a plurality of radially outwardly directed expansive forces on said sleeve spaced substantially uniformly about the entire circumference thereof for expanding said sleeve into flow-stopping sealing engagement with the edges of the opening through the pipe line.

19. A pipe stopper comprising: a longitudinally-split flexible cylindrical sleeve adapted to be inserted into, and having a normal outer diameter less than, a transverse circular opening through a pipe line, the diameter of the opening being at least as large as the inner diameter of the pipe line; means defining a plurality of radially-disposed circumferentially-narrow wedging surfaces on the interior of said sleeve and spaced substantially uniformly about the entire circumference thereof; wedge means confined within the peripheral outline of said sleeve and mounted for movement into wedging engagement with said wedging surfaces to produce a plurality of radially outwardly directed expansive forces on said sleeve spaced substantially uniformly about the entire circumference thereof for expanding said sleeve into flow-stopping sealing engagement with the edges of the opening through the pipe line; means operatively connected to said sleeve and extending axially therefrom for rotating the sleeve to position the split therein on the upstream side of the pipe line; and means independent of said rotating means within said sleeve and operatively connected to said wedge means for effecting movement of said wedge means into wedging engagement with said wedging surfaces.

20. A pipe stopper comprising: a cylindrical sleeve adapted to be inserted into a transverse circular opening through a pipe line, said sleeve having a narrow longitudinal slot extending the entire length thereof; means defining a plurality of axially-inclined radially-disposed circumferentially-narrow wedging surfaces on the interior of said sleeve and spaced substantially uniformly about the entire circumference thereof; wedge means confined within the peripheral outline of said sleeve and of symmetrical configuration with respect to the axis thereof; and means mounting said wedging means for axial movement into engagement with said wedging surfaces for a wedging action therewith effective to produce a plurality of radially outwardly directed expansive forces on said sleeve spaced substantially uniformly about the entire circumference thereof for expanding said sleeve into flow-stopping sealing engagement with the edges of the opening through the pipe line.

21. A pipe stopper comprising: a longitudinally-split flexible cylindrical sleeve adapted to be inserted into, and having a normal outer diameter less than, a transverse circular opening through a pipe line, the diameter of the opening being at least as large as the inner diameter of the pipe line; means defining two radially-disposed circumferentially-narrow wedging surfaces on the interior of said sleeve and disposed closely adjacent to, at equal distances from, and on opposite sides of the split therein; and wedge means confined within the peripheral outline of said sleeve and mounted for movement into wedging engagement with said wedging surfaces for expanding said sleeve into flow-stopping sealing engagement with the edges of the opening through the pipe line.

22. A pipe stopper comprising a longitudinally-split cylindrical sleeve adapted to be inserted into, and having a normal outer diameter less than, a transverse circular opening through a pipe line, the diameter of the opening being at least as large as the inner diameter of the pipe line; expanding means within said sleeve and confined within the peripheral outline thereof for expanding said sleeve into flow-stopping sealing engagement with the edges of the opening through the pipe line; means connected to said expanding means and extending axially from said sleeve for operating said expanding means; and means independent of said operating means connected to said sleeve and extending axially therefrom for angularly orienting the same within the pipe line opening.

23. A pipe stopper comprising: a longitudinally-split cylindrical sleeve adapted to be inserted into, and having a normal outer diameter less than, a transverse circular opening through a pipe line, the diameter of the opening being at least as large as the inner diameter of the pipe line; expanding means within said sleeve for expanding the same into flow-stopping sealing engagement with the edges of the opening through the pipe line; means within said sleeve effective upon rotation thereof for operating said expanding means; means operatively connected to said sleeve and extending axially therefrom for angularly orienting said sleeve within the opening in the pipe line; and means independent of said orienting means operatively connected to said operating means and extending axially of said sleeve for operating said operating means.

24. The structure defined in claim 23 in which the sleeve orienting means includes a hollow shaft and the separate means includes a shaft extending coaxially in said hollow shaft.

25. A pipe stopper comprising: a longitudinally-split cylindrical sleeve adapted to be inserted into, and having a normal outer diameter less than, a transverse circular opening through a pipe line, the diameter of the opening being at least as large as the inner diameter of the pipe line; expanding means within said sleeve effective to apply substantially radially-outwardly directed expansive forces to said sleeve at locations thereon closely adjacent to, at equal distances from, and on opposite sides of the split therein; means for operating said expanding means; and means independent of said operating means connected to said sleeve and extending axially therefrom for angularly orienting the same within the pipe line opening.

26. A pipe stopper comprising: a longitudinally-split cylindrical sleeve adapted to be inserted into, and having a normal outer diameter less than, a transverse circular opening through a pipe line, the diameter of the opening being at least as large as the inner diameter of the pipe line; a plurality of radially-inwardly extending vanes secured to the interior of said sleeve and having oppositely tapered portions; a pair of oppositely tapered cones cooperating with said vane tapered portions for expanding said sleeve upon relative axial movement between said cones; means connected to said cones for effecting relative axial movement therebetween, and means independent of said last-mentioned means and connected to said sleeve for inserting and removing the latter from the pipe line opening without effecting relative axial movement between said cones.

References Cited in the file of this patent

UNITED STATES PATENTS

| 198,547 | Meyer | Dec. 25, 1877 |
| 1,058,669 | Goddard | Apr. 8, 1913 |
| 2,171,937 | Larry et al. | Sept. 5, 1939 |
| 2,237,476 | Cline | Apr. 8, 1941 |
| 2,466,313 | Humason | Apr. 5, 1949 |

FOREIGN PATENTS

| 331,216 | France | Sept. 2, 1903 |